United States Patent Office 2,959,487
Patented Nov. 8, 1960

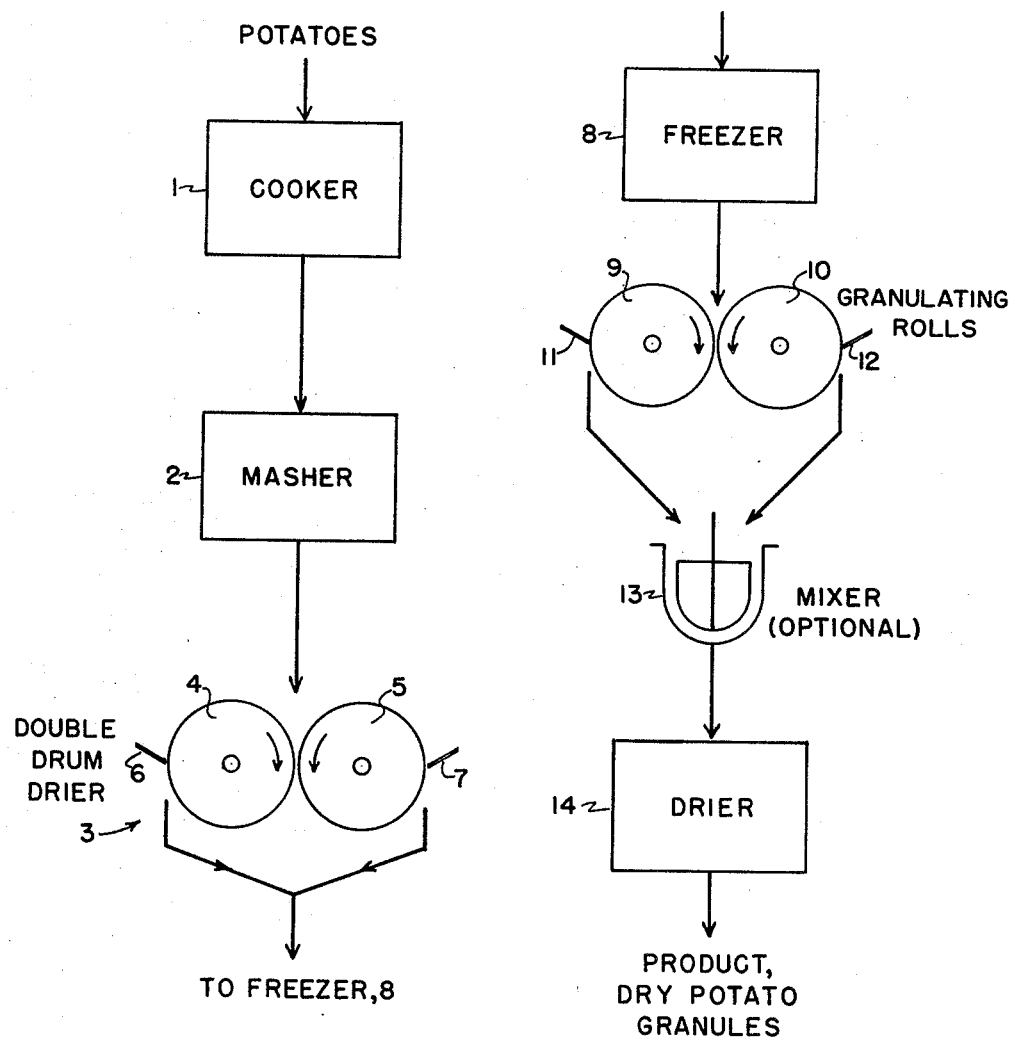

2,959,487
PRODUCTION OF DEHYDRATED POTATOES

George K. Notter and Carl E. Hendel, Berkeley, Calif., assignors to the United States of America as represented by the Secretary of Agriculture Filed Feb. 3, 1959, Ser. No. 790,981

3 Claims. (Cl. 99—207)

(Granted under Title 35, U.S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to improved processes for preparing dried potato granules, that is, dehydrated, precooked potatoes in granular form. A particular object of the invention is the provision of methods which yield potato granules of a quality not attainable by present commercial processes. Another particular object of the invention is the provision of methods which not only yield products of superior quality but which are more efficient than known procedures. Further objects and advantages of the invention will be evident from the following description taken in conjunction with the annexed drawing. Parts and percentages set forth herein are by weight unless otherwise specified.

The drawing represents a schematic flow sheet illustrating the steps applied in producing potato granules in accordance with this invention.

In producing dehydrated potato granules, it is always the aim to obtain a product which on mixing with water, rapidly forms a mashed potato dish of mealy texture comparable to freshly prepared mashed potatoes. This desideratum, however, eludes attainment in commercial operations. A foremost problem is that the reconstituted mash tends to be sticky and pasty instead of mealy. This undesirable effect is caused by a rupture of cells during processing whereby starch is released from the cells. It is the presence of this extracellular starch which gives the reconstituted product its pasty texture. Cell rupture is principally caused in the step or steps of the process wherein the potato material is subdivided. Thus, to produce a product which reconstitutes rapidly and which forms a mash on reconstitution, it is necessary that the dry product be in finely subdivided form. Accordingly, somewhere along the line it is necessary to reduce the potato tissue to particulate form. This is very difficult to do effectively. For example, if the potatoes are dried in the form of slices, slabs, or dice then pulverized, the product is totally useless. Pulverization of the dried potato tissue causes such extensive cell damage that the product on addition of water forms an unpalatable paste. On the other hand, it is futile to subdivide the potato tissue early in the process when it is highly moist because the particles will stick together and dry as agglomerated lumps which will not reconstitute properly; they will form a lumpy unappetizing dish. Moreover, the product cannot be dehydrated uniformly—the lumps will tend to form horny crusts about the still-moist inner portions.

Various procedures have been advocated to attain the desired subdivision with a minimum of cell rupture. One procedure—known as the add-back process—is presently employed on an extensive scale in this country. The process involves these steps: Potatoes are peeled, sliced, cooked in steam, then mashed. The mashed potatoes are mixed with sufficient dried potato granules from a previous batch to give a moisture content of about 35% for the composite material. This material is conditioned by holding it at approximately 60 to 80° F. for an hour or more. The conditioned composite material is then dehydrated in a pneumatic drier to produce the dried granules. In this procedure the add-back operation (addition of previously dried granules to the mashed potatoes) is a critical step as it converts the sticky mashed potatoes into a free-flowing moist powder which can be dehydrated readily without agglomeration of the individual particles. Although the add-back process is widely used it presents many significant disadvantages, as explained below:

One disadvantage of add-back is that the dehydration equipment must handle about 6 to 10 times as much material as is actually packaged. To further explain—in order to reduce the moisture content of the mashed potatoes (originally 75–80%) to a level of about 35%, approximately equal weights of dried granules and mashed potatoes must be mixed. Then, when this composite product is dried, about 84–90% of it must be returned for recycling. It is thus obvious that only about one-tenth to one-sixth of the solid material being handled is product; the remainder stays in the system. Naturally, this means that the equipment must be several times as big as would be needed to handle a certain level of output and operating costs are correspondingly increased. Another point is that this continued recycling means that the product has been through the dehydrator about 6 to 10 times. Obviously, any subjection of potato tissue to dehydrating operations will expose it to conditions of mechanical, heat, and oxidative damage and to expose it many times will multiply the amount of quality damage, particularly cell rupture caused by mechanical stresses such as abrasion. A third problem caused by this continued recycling is that the system is very inflexible and if a bad lot of material is produced it will take considerable production before the effect of this bad run is essentially eliminated. This is caused by the fact that the major proportion of the bad lot must be recycled with the result that each successive lot will contain a proportion of the bad material. Oftentimes it will take many hours of production to eliminate the effect of one bad lot. Naturally much thought has been given in the industry to schemes for eliminating the add-back procedure. However, despite much investigation and experimentation no practical process has been heretofore devised.

It has been advocated in the prior art that the problem of cell rupture during the subdivision step can be minimized by a conditioning step, involving a holding of the potato mash, preferably after partial dehydration, in a refrigerated state. Such procedure is shown for example, by Barker, British Patent No. 542,125 (1942). In this process, potatoes are peeled, washed, cooked, mashed, then partially dehydrated. The partially dehydrated mash is then chilled and held at such temperature for a period long enough to equilibrate the moisture content and toughen the cell walls. The conditioned mash is then pressed through a sieve while contacting it with heated air to form a moist powder which can be dehydrated without agglomeration of the individual particles.

The process outlined above offers the advantage that the add-back step is not used. However, the process involves certain disadvantages, explained as follows: For one thing, relatively long periods of conditioning the partly dried mash are advocated. This has the disadvantage that the potato material tends to become gray, develops off-flavors, and suffers a loss in vitamin content. Another point is that the step of forcing the conditioned mash through a sieve causes substantial cell rupture. Consequently the final product tends to form a pasty material when reconstituted. To avoid pastiness the product must be reconstituted with water at not over 80° C. (176° F.)—this produces a mashed potato dish in a relatively luke-warm state rather than piping hot as required in good cooking practice.

The process in accordance with the present invention obviates the disadvantages of prior processes explained above. For one thing, the add-back step with its manifold disadvantages is eliminated. Another point is that extended storage in the conditioning step is unnecessary. A further item is that a unique method is employed to subdivide conditioned potato mash whereby cell rupture is avoided. In sum, the present process not only yields a superior product but offers a simplified and more effective procedure. Superior quality of the present product is particularly demonstrated by the fact that it can be reconstituted with boiling water without formation of pastiness.

A particular feature of the present invention is that partially dehydrated, cooked potato mash is frozen and granulated while in the frozen state. This combination of steps contributes certain distinct advantages. The basic idea of chilling or freezing potato material to condition the tissue so that it may be subdivided with a decreased amount of cell rupture is, of course, not new with the present inventors. Procedures embodying such a step are disclosed for example by Barker (British Patent 542,125). However in the Barker process, the frozen potato material is thawed prior to rubbing it through a sieve to reduce it to fine particle size suitable for final dehydration. The researches of the present inventors indicate that Barker's step of thawing the material prior to sieving is detrimental as thereby a substantial degree of cell rupture takes place during sieving. That such cell damage occurs in the Barker process is shown by the fact that the patentee recommends reconstitution of his product with water at a temperature up to 80° C. (176° F.). With the process of the present invention, the product can be reconstituted even with water at the boiling point to obtain a mashed potato dish of proper texture, that is, free from pastiness. Such a superior result is obtained in the present process by granulating the potato mash while in the frozen state. In this condition application of pressure—exerted for example by rolls or the like—causes the potato material to flow whereby it may be extended into a very thin sheet without any significant rupture of cells. This thin sheet has no self-sustaining properties and automatically breaks apart forming small particles or platelets. These particles are in an eminently suitable condition for application of final dehydration. Thus when they are subjected to dehydration they form a dry product in granule form which reconstitutes rapidly to form a potato mash of desirable mealy texture and consistency.

The process of the invention is further explained by reference to the annexed drawing. Referring to this drawing, raw potatoes are peeled, washed, cut into slabs or slices, then cooked in conventional manner in cooker 1. Preferably, the cooking is carried out by contacting the potatoes with steam at about 212° F.

The cooked potatoes, while hot, are mashed in masher 2. This operation may be carried out by pressing the cooked potatoes between warm rolls, by pressing them through a screen, or by other conventional potato-mashing techniques.

The mashed potatoes are then partially dehydrated. This may be conveniently done, for example, on double-drum drier 3. The mashed potatoes are fed into the nip between rotating drums 4 and 5 and the partially dried potato material removed by scrapers 6 and 7. Drums 4 and 5 are generally heated to a temperature in the range about from 150 to 300° F. The temperature of the drums, the speed of rotation, and the thickness of the film of potato material are so correlated that the partially dried potato mash has a moisture content about from 50 to 70%, preferably about 60%. Although partial drying on heated drums is a preferred technique, it is not essential to use it. Thus other conventional dehydration procedures such as exposing thin layers or extruded portions of the mash to a current of hot air, vacuum dehydration techniques, and so forth can be employed.

Next, the partially dried mash is frozen in freezer 8. This freezing step may be accomplished in various ways. For example the mash may be spread on trays and subjected to a current of refrigerated air. In the alternative, the trays carrying the mash may be placed in a chamber which may be sealed and subjected to vacuum. In this case the freezing will be caused by rapid evaporation of moisture. In any event, the temperature of the partially dried mash should be brought to a level at which the mash freezes. This will generally be about 27° F., or below, depending on the moisture content of the mash. Preferably, the mass is frozen while in relatively thin layers, that is, a thickness of about one inch or less. This facilitates treatment of the frozen material in the next step. Where the freezing is accomplished by subjection of the material to vacuum, it is obvious that the proportion of water evaporated in the previous partial drying step may be reduced since application of the vacuum will cause a certain degree of drying. Thus where the freezing is effectuated by vacuum treatment the proportion of moisture removal in the partial drying step is so adjusted that the frozen material contains about from 50 to 70%, preferably 60% of water. The mash may be stored while in the frozen state before proceeding with the next step (granulation). However, it has been observed that no particular advantage is gained by such holding period. Accordingly, a preferred embodiment of the process of the invention involves application of the granulation step without any substantial delay following freezing of the mash.

In the granulation step, the frozen mash is fed into the nip between rolls 9, 10. These rolls are at room temperature and spaced a small distance from one another. Generally, the clearance between the rolls is about from 0.01 to 0.02 inch. In this way, the frozen mash is pressed into a very thin layer, essentially one cell in thickness, which is removed from the rolls by the action of scrapers 11, 12. As the material is dislodged from the rolls 9, 10 it breaks up into small flakes or platelets.

As noted hereinabove, the step of granulating the frozen mash while in the frozen state is a critical factor in the process of the invention. In this state the potato material is particularly adaptable to granulation without cell rupture. Thus as pressure is applied to the frozen tissue, localized melting occurs with subsequent refreezing as the material moves away from the area of maximum pressure. In effect, this permits of a rearrangements of the cells into the desired conformation—a very thin sheet—without rupture of the cells. The extrusion of the frozen material into the very thin sheet may be defined as involving a localized fluidization at the point of maximum pressure which permits free flow of individual cells with minimum damage to these cells. In the area of localized fluidization, the liquid phase formed acts as a lubricant or vehicle which permits the individual cells to slide over one another and protects them from mechanical injury. Such action is of course in sharp contrast to techniques wherein the frozen mash is thawed prior to being rendered into fine particles. In such case there is no protective fluidization and the cells tend to be ruptured by mechanical stresses such as abrasion, compression, shearing, etc. It may further be noted that in the process of the invention, the fluidization is strictly localized at the area of pressure—any liquid formed is reabsorbed by the potato material as it moves through the extrusion device. Hence there is no expression of liquid from the potato material and no loss of soluble components.

The flakes of potato material from granulating rolls, 9, 10 may then be subjected to mixing in mixer 13. In this step, the flakes are gently agitated to cause a breaking up of the particles. The use of violent agitation or other excessive mechanical action is to be avoided as it will tend to rupture cell walls which in turn will cause the final product to be pasty when reconstituted. Although this mixing operation is preferably used, it is not an essential step and the material from granulating rolls 9, 10 may be fed directly to the dehydration step in drier 14. Thus the film potato material produced by granulating rolls 9, 10 is so thin that it has essentially no self-sustaining properties and breaks up into small fragments by its own weight. These fragments on subjection to any type of handling as necessary in the subsequent dehydration step break up into granules consisting of individual cells or small aggregates of individual cells.

The granulated potato material, directly from rolls 9, 10 or from mixer 13 is then dehydrated to form the final product, i.e., dried potato granules. This final dehydration may be carried out in any manner as is conventional in the art. As an example, the potato material may be dehydrated by procedures incorporating the principle of fluidization. To this end, the potato material is placed in a vessel provided with means for jetting minute streams of hot air up through the bed of material tending to keep it in a fluidized state while being dried. Apparatus of this type and method of employing it to dehydrate moist potato particles are disclosed by Neel et al. (Food Technology, 1954, vol. VIII, pp. 230–234). To further promote fluidization of the product in the early part of this drying operation, this fluidized-bed drier can be subjected to continuous vibration or shaking, or a mechanical agitator can be employed. In the alternative, the granulated potato material may be dehydrated in pneumatic-type driers, for instance, a device of the type disclosed by Olson et al. in Food Technology, vol. VII, pp. 177–181 (1953). This device consists essentially of a long, vertically positioned duct. Hot air at about 212–392° F. is forced upwardly at high velocity (i.e., about 1000 ft./min.) through the duct and the friable granulated potato material is fed into this air stream. As the current of air carries the material upward it is subdivided into granules and dehydrated. At the top of the duct is a conically diverging diffuser so that as the current rises into the diffuser its velocity is gradually diminished. A deflector is positioned above the diffuser whereby the now slowly moving current is deflected downward causing the dried potato granules to drop out of the air stream so that they can easily be separated from the moist exhaust air.

Although the final dehydration is preferably carried out in fluidized-bed or pneumatic driers, it is not essential to use such apparatus. Thus the granulated potato material may be dehydrated in any type of apparatus which is generally suitable for dehydrating vegetable materials. For example the granulated material may be spread on trays and subjected to a current of hot air in a tunnel or tray drier. Also, the granulated material may be dried in conventional vacuum dehydration equipment. Generally, the final product has a moisture content of 10%, or less.

The invention is further demonstrated by the following illustrative examples.

*Example I*

Raw potatoes (Idaho Russets) were peeled, washed and cut into slabs about ¾ inch thick. The potatoes were then cooked by exposing them to steam (212° F.) for about 25 minutes. The cooked potatoes, while hot, were then mashed by pressing them through a ¼ inch mesh screen.

The mash was then partially dehydrated on a double-drum drier. The drums were at a temperature of 240° F., separated by a clearance of 0.01 inch and were rotated at one r.p.m. The partially dehydrated mash had a moisture content of 63%.

The partially dried mash was then placed on stainless steel trays in a layer about ¾ inch thick. The loaded trays were placed in a vacuum chamber where they were exposed to a vacuum of 3.5 mm. Hg for about 20 minutes whereby the mash was brought to a temperature of 26° F. The vacuum system was then disconnected and the frozen mash removed. Due to evaporation of moisture during vacuum treatment, the moisture content of the frozen mash was 56%.

The mash while still frozen was fed into granulating rolls as depicted in the drawing. The rolls were at room temperature and clearance between the rolls was 0.01 inch. The frozen mash was thus granulated into small flakes or platelets. This material was mixed for five minutes in a planetary-type food mixer operating the mixing blade at slow speed, about 60 r.p.m.

The granulated material was then put on trays which were inserted in a tunnel drier wherein the potato material was subjected to a current of air at 120° F. After two hours the product was dehydrated—moisture content less than 10%.

A sample of the product (108 grams) was added to 2 cups of boiling water and mixed with a fork. In less than one minute the product was reconstituted forming mashed potatoes of desirable mealy texture, free from lumps and pastiness. Color of the mashed potatoes was creamy-white and the taste was excellent—indistinguishable from freshly prepared mashed potatoes.

*Example II*

Raw potatoes (Idaho Russets) were peeled, washed, and cut into slabs about 0.75 inch thick. The potatoes were then cooked by exposing them to steam (212° F.) for about 25 minutes. The cooked potatoes while hot were then mashed by pressing them through a 0.25 inch mesh screen.

The mash was then partially dehydrated on a double-drum drier. The drums were at a temperature of 220° F., separated by a clearance of 0.01 inch and were rotated at one r.p.m. The partially dehydrated mash had a moisture content of 62%.

The partially dried mash was then placed on stainless steel trays in a layer about 0.5 inch thick. The loaded trays were placed in a freezer where they were subjected to a current of air at 15° F. for one hour. At the end of this time the frozen mash was removed from the freezer. The mash was at a temperature of 17° F. and had a moisture content of 60%.

The mash while frozen was fed into granulating rolls as depicted in the drawing. The rolls were at room temperature and clearance between the rolls was 0.01 inch. The frozen mash was thus granulated into small flakes or platelets having essentially monocellular thickness. This material was mixed for 5 minutes in a planetary-type food mixer operating the mixing blade at slow speed, about 60 r.p.m.

The granulated material was then put on trays which were inserted in a tunnel drier wherein the potato material was subjected to a current of air at 120° F. After two hours the product was dehydrated—moisture content less than 10%.

A sample of the product (108 grams) was added to 2 cups boiling water and stirred with a fork. In less than one minute the product was reconstituted forming mashed potatoes of desirable mealy texture, free from lumps or pastiness. Color of the mashed potatoes was creamy-white and the taste was excellent, indistinguishable from freshly prepared mashed potatoes.

Having thus described the invention, what is claimed is:

1. A process for producing dried potato granules which comprises freezing mashed, cooked potatoes, the moisture content of which has been previously reduced to a level about from 50 to 70%, granulating the potato material by extruding it while still in a frozen condition to form small, thin particles and subjecting these particles to dehydration.

2. The process of claim 1 wherein the granulation is accomplished by extruding the frozen potato material into a film having a thickness in the range about from 0.01 to 0.02 inch, which film is of a friable nature and readily breaks up into small particles of the said thickness.

3. In the process of preparing dried potato granules wherein raw potatoes are cooked, the cooked potatoes are mashed, the mashed potatoes are partially dehydrated to a moisture content about from 50 to 70%, the partially dehydrated mash is frozen, reduced to particulate form, and subjected to final dehydration to a self-preserving condition, the improvement which comprises extruding the frozen, partially-dehydrated mash between opposing surfaces spaced apart a distance small enough to form a thin, substantially monocellular film of potato tissue which breaks apart into small particles, and applying the final dehydration to these particles.

References Cited in the file of this patent

UNITED STATES PATENTS

| | | |
|---|---|---|
| 2,564,296 | Bostock | Aug. 14, 1951 |
| 2,572,761 | Rivoche | Oct. 23, 1951 |
| 2,742,847 | Miers | Apr. 24, 1956 |

FOREIGN PATENTS

| | | |
|---|---|---|
| 542,125 | Great Britain | Dec. 29, 1941 |